United States Patent

[11] 3,607,630

| [72] | Inventors | John M. West;<br>William D. Fletcher, III, both of Hartford, Conn. |
|------|-----------|---|
| [21] | Appl. No. | 852,175 |
| [22] | Filed | Aug. 22, 1969 |
| [45] | Patented | Sept. 21, 1971 |
| [73] | Assignee | Combustion Engineering, Inc.<br>Windsor, Conn. |

[54] MOLTEN CORE STOPPING DEVICE
12 Claims, 8 Drawing Figs.

[52] U.S. Cl. ..................................... 176/38,
176/87, 176/37
[51] Int. Cl. ....................................... G21c 9/00
[50] Field of Search ............................. 176/37, 38, 87

[56] References Cited
UNITED STATES PATENTS

| 3,168,445 | 2/1965 | Ziegler et al. | 176/38 |
| 3,260,649 | 7/1966 | Jens et al. | 176/18 |
| 3,378,452 | 4/1968 | Costes | 176/40 |
| 3,503,849 | 3/1970 | Yevick et al. | 176/30 |

*Primary Examiner*—Reuben Epstein
*Attorneys*—Harris G. Luther and Radford W. Luther ABSTRACT: A water-cooled metal basin is located under a nuclear reactor vessel to catch, cool, solidify and retain molten core material dropped from the vessel upon a burn-through of the vessel. A plurality of horizontally disposed water-filled tubes in the basin have a common inlet connected with an elevated storage tank and have discharge outlets positioned at a height at least equal to the water level in the storage tank. The basin provides a level floor on which the molten core material may spread out in a thin layer and be solidified and maintained solid by transfer of heat to water passing through the tubes. The tubes may also extend vertically above the basin to absorb heat radiated from the upper surface of the layer and radiating fins may be provided in the basin. A second material may also be provided to absorb heat from the molten reactor material by melting of the second material thereby solidifying the molten core material. Waterflow is started automatically by convention and gravity.

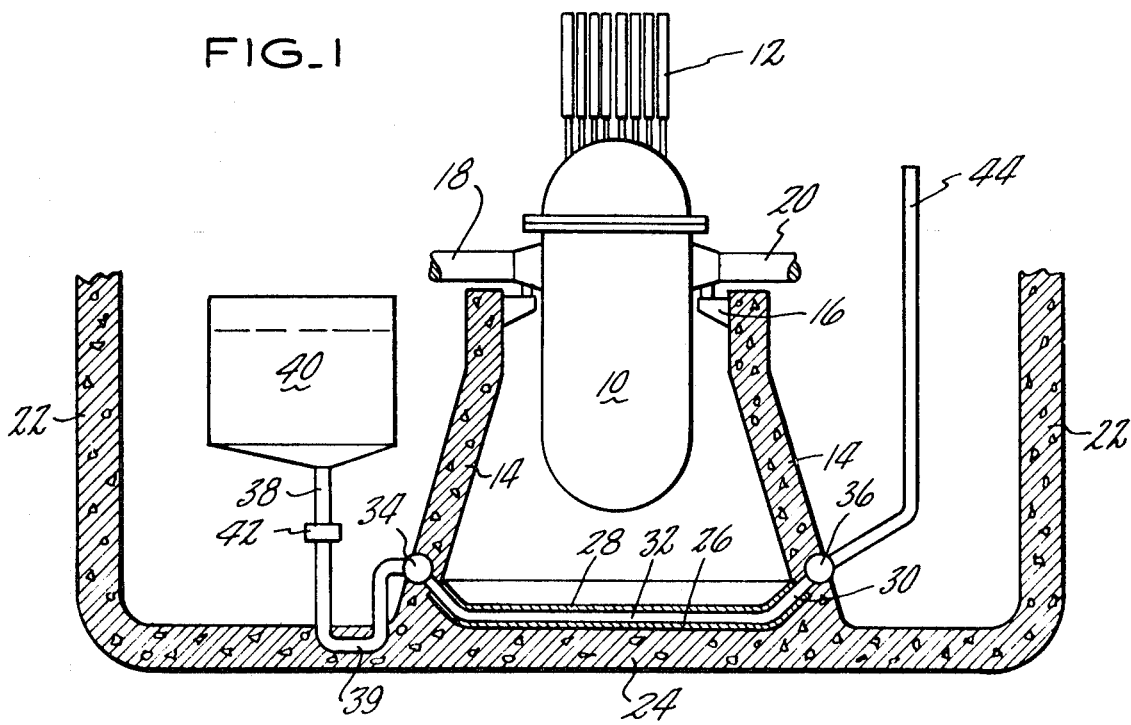
FIG._1
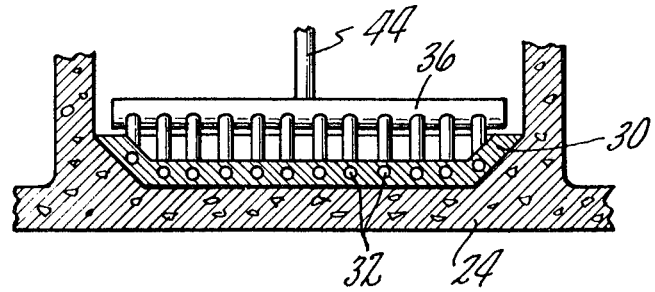
FIG._2
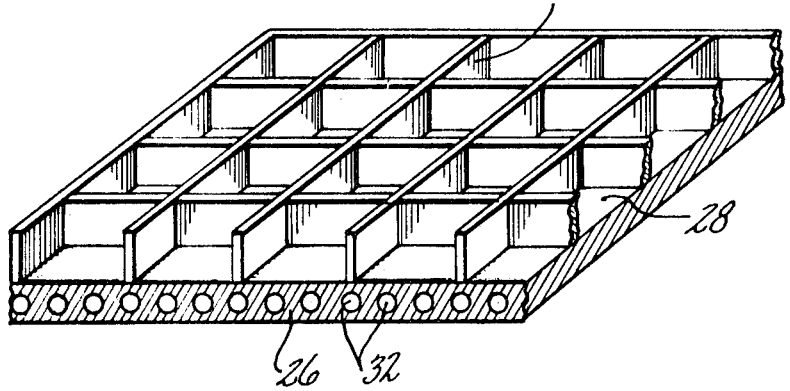
FIG._3
INVENTORS
WILLIAM D. FLETCHER III
JOHN M. WEST
BY Harris G. Luther
ATTORNEY

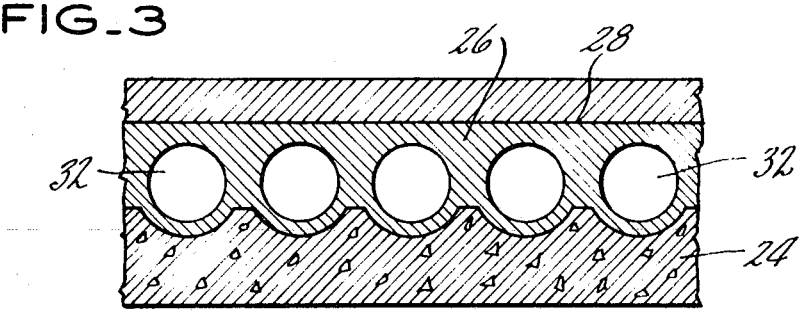
FIG_3
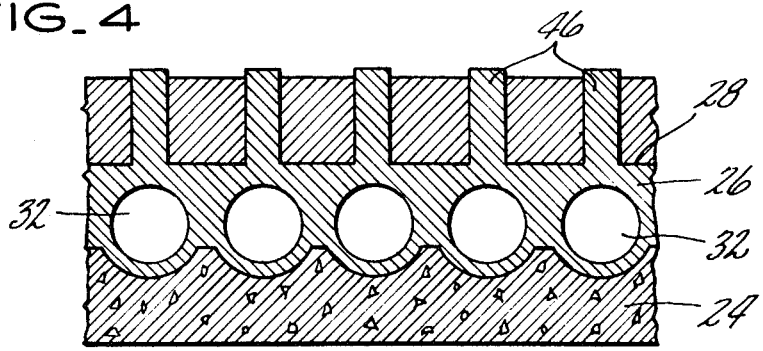
FIG_4
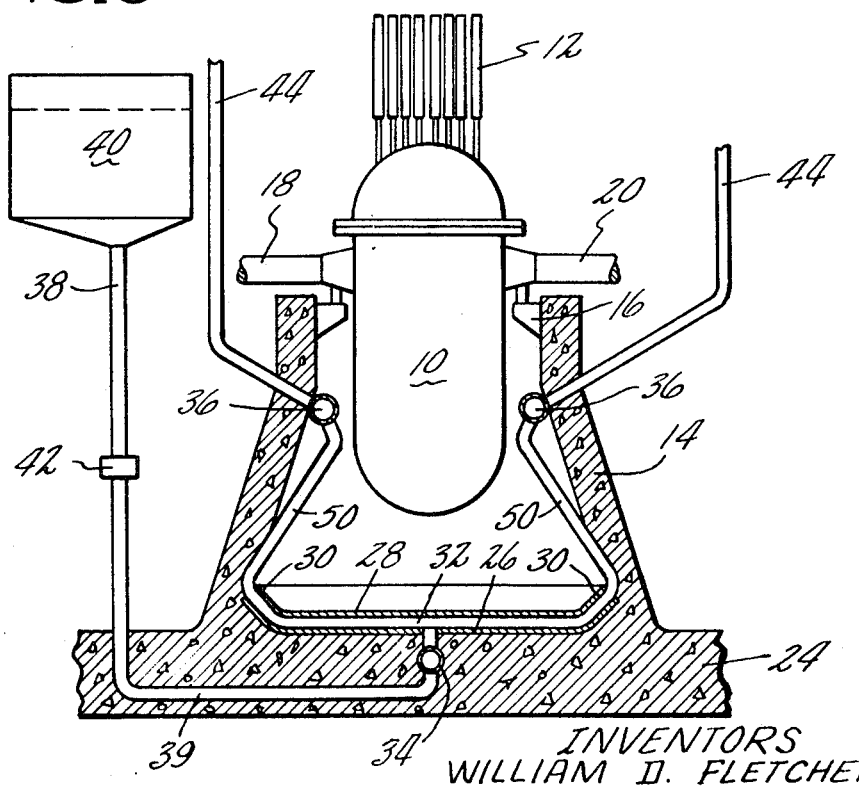
FIG_6

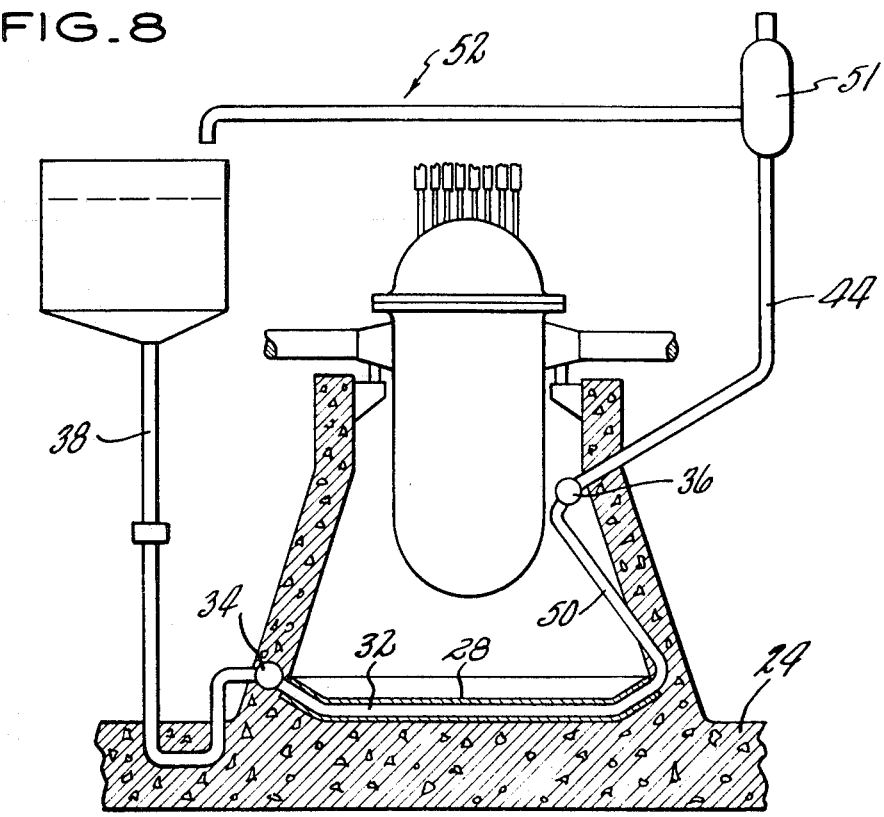
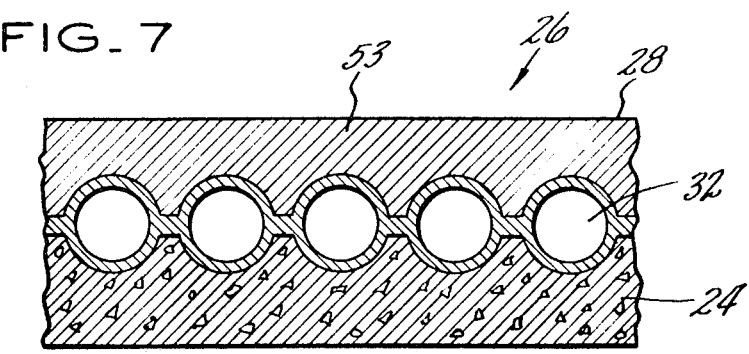

MOLTEN CORE STOPPING DEVICE

BACKGROUND OF THE INVENTION

In the present design of nuclear reactors particularly when used in electric or power generating systems, the reactor core is housed in a pressure vessel containing a heat-transferring fluid and the vessel is housed in an airtight containment building to prevent escape of radioactive materials in the event of an accident.

After the nuclear reactor has been in operation for an appreciable time the uranium forming the active material of the reactor will in the process of fission have produced a material quantity of various radioactive isotopes. The radioactivity of the isotopes will decay over a predetermined length of time depending upon the particular isotopes, and in the decaying process will produce heat which must be removed and dissipated in order to prevent the temperature of the nuclear core from increasing due to the heat generated and exceeding the melting point of the core material.

During normal operation when the core is producing power by the fissioning of uranium, the core is immersed in an surrounded by water under high pressure, such as 2,250 p.s.i., which water is circulated through the core and through a heat exchanger to transfer the heat from the core to the exchanger which is used to produce steam for generating electricity. This circulating water is also needed in the reactor to slow the neutrons given off by the fissioning uranium down to a speed which will produce the desired fissioning of uranium atoms. When the reactor core is shut down and is not producing power by the fissioning of uranium, such as when the reactor is being dismantled for refueling, it is also necessary to have water surrounding and circulating through the core to remove the heat produced by the decaying of the radioactive materials in the reactor core. Thus water is needed to remove heat from the core and prevent the buildup of heat in the core both when the core is active, producing power by a fission process, and when it is inactive. Loss of the water would prevent further fission of the uranium because the water is needed to slow down the neutrons to produce fission. However, such loss of the cooling water would prevent further heat dissipation and the heat produced by decay of the radioactive isotopes would cause the core temperature to rise and exceed the melting point of the core materials.

The core materials is suspended in a pressure vessel which acts as a container for the water circulating through the core. For a normal large electric-generating station the core will contain approximately 100 tons of uranium, normally as uranium dioxide pellets encased in sealed metal tubes. In the absence of means for dissipating sufficient heat due to failure of the safety devices normally provided to keep the core immersed in water, the decay heat alone can raise the core material to 5,000° F., the melting point for uranium dioxide. In the absence of means for removing heat from the reactor vessel itself the molten uranium dioxide is at temperature above the melting point of the steel reactor vessel and could melt through the reactor vessel and drop onto the floor of the containment building. The containment building is normally made of steel and concrete and is 5 or more feet thick and is maintained airtight, Without means to conduct sufficient heat from the containment building floor the molten uranium dioxide containing the heat-generating radioactive materials will remain molten and could melt through the containment building floor and thus escape into the surrounding territory causing a health hazard to the public.

Presently it is not considered necessary to design for a meltdown of the reactor core because of the large number of redundant safety systems provided. Core melting following the maximum hypothetical accident is prevented by safety systems that provide core-cooling water. Even if these systems were to fail, analyses indicate that a molten core might not penetrate the bottom of the reactor vessel provided there is water against the outside surface of the reactor vessel to cool the reactor vessel material. However, it has not been practical to demonstrate that such means for preventing the escape of fission products from the containment building would be effective.

If it becomes necessary to consider more severe hypothetical accidents or to assume more severe malfunctions of some of the safety systems, a core meltdown and penetration of the reactor vessel may need to be considered in the design of nuclear reactor plants.

Methods have been proposed to catch and retain the molten core after penetration of the reactor vessel. Some of these proposed methods kept the core in a molten state and depended on heat transfer by boiling part of the molten core to remove decay heat and the molten core was to be in contact with water. Very little is known about the behavior of the molten core material and the molten core material in contact with water. A passive system is proposed that will limit the consequences of a core meltdown and reactor vessel penetration by returning the core to a solid state and removing heat without depending on contact between the core material and water.

The present invention provides a water-cooled catch basin for the molten core and a water supply adequate to maintain the core in a safe condition until additional water can be provided. Waterflow through cooling tubes in the basin is started and maintained automatically by gravity-induced natural circulation caused by heat from the reactor core.

SUMMARY OF INVENTION

According to the present invention a water-cooled catch basin is provided within the containment building and under the reactor vessel in position to catch and solidify any molten core material that may drop. The basin has an upstanding rim to restrain outward flow of molten material and is built up of horizontally extending tubes welded together to form a liquid-tight basin. The mass of the basin can be sufficient by itself to absorb sufficient heat to initially solidify the molten core material without reaching the melting temperature or the alloying temperature of the tubes. A second material such as a layer of lead on top of the tubes could also be provided. The heat absorbed by melting (and vaporization) of this second material could be used to solidify the molten core material. The tubes have an inlet connected to an elevated storage tank and an outlet having less resistance to fluid flow so that steam formed in the tubes by the temperature rise in the basin will automatically start flow of cooling fluid from the storage tank through the tubes and out the outlet. A cold trap on the inlet side of the basin can also be provided to insure that flow is initiated in the proper direction. A catch tank or steam-separating device can also be connected to the outlet to collect any water discharged from the basin and return this water by means of a flowpath from the catch tank or steam-separating device to the elevated storage tank at the basin inlet. The storage tank has a capacity sufficient to maintain flow for several hours during which time the supply in the tank may be replenished to provide an inexhaustible supply of cooling water. The area of the basin is large enough to limit the thickness of the molten core to a value such that the top of the core material will be at a temperature less than the melting point. The required area may be reduced, if desired, by providing fins or studs on the basin upper surface which will permit a greater thickness of core material to be maintained in the solid state or by removing heat from the top surface by radiation to vertical walls on the basin.

DESCRIPTION OF THE DRAWINGS

FIG. 1 is a partial side elevation, partially in section, of reactor vessel and a containment building incorporating the present invention.

FIG. 2 is a partial sectional end view of the structure shown in FIG. 1.

FIG. 3 is a partial sectional view through the catch basin and the water-cooling tubes.

FIG. 4 is a section similar to FIG. 2 but showing the additional heat-radiating pins.

FIG. 5 is a partial perspective view partially in section showing an eggcrate type of extended surfaces.

FIG. 6 is a view similar to FIG. 1 showing additional radiation-absorbing surfaces formed by the water tubes and a centrally located inlet header and two outlet headers and discharge pipes.

FIG. 7 is a view similar to FIG. 3 showing a second material positioned to absorb heat from the molten core material.

FIG. 8 is a view similar to FIG. 1 showing a catch tank or a steam-separating device to collect any water discharged from the basin with the steam to return this water to the basin inlet.

DESCRIPTION OF THE PREFERRED EMBODIMENT

Referring to FIG. 1, the usual reactor vessel 10 containing the usual nuclear reactor core and the control means 12 is supported in a well-known manner on a pedestal 14. The pedestal is a hollow circular pillar surrounding the vessel and having a ledge 16 extending inwardly therefrom and providing means acting as a support for the vessel. Pipes 18 and 20 act as inlets and outlets for high pressure water that is circulated through the core and conducts heat from the core to a heat exchanger in which heat is transferred to a working fluid which in turn is conducted to a motor such as a turbine for driving a generator all of which are well known and not shown in the present drawings. The reactor vessel 10 and its supporting pedestal 14 are contained in the usual airtight containment building having walls 22 and a floor 24.

A catch basin 26 in the form of a basin is positioned on the floor 24 of the containment building directly under the reactor vessel 10. The basin 26 may be of any desired shape such as round or rectangular. The basin has a generally level upper surface 28 and upstanding edges 30 extending entirely around the basin. The basin is made up of a plurality of tubes 32 arranged horizontally in generally parallel arrangement and having upturned portions at either end generally conforming to the contour of the basin. The upturned portions at one end of the tubes are welded into an inlet header 34 and the upturned portions at the other end of the tubes are welded into an outlet header 36. The tubes are all welded together and sufficient metal is added to form a liquidtight bottom and upstanding rim portions for the basin. Thus as shown in FIG. 3 the basin will constitute a unitary liquidtight metal unit having water-cooling tubes 32 embedded therein and having a solid level metal upper surface 28. The system thus far described comprises a large number of closely spaced horizontal tubes welded together to form a continuous liner on the floor of the reactor cavity. The tubes and the ligaments between the tubes form a thick basin that could withstand the impact of the falling molten core. The basin is supported from below by the reactor cavity floor or by separate supports extending from this floor.

The inlet header 34 is connected by an inlet tube or riser 38 preferably through a cold water trap 39 with a tank 40. The tank 40 acts as a cooling water storage tank for supply cooling water to the tubes embedded in the basin or waterwall. The tank has a capacity sufficient to supply all the needed cooling water for several hours. This water supply is always available and will start flowing automatically when the waterwall forming the bottom of the basin is heated. If desired the riser 38 may be supplied with a check valve 42 in lieu of or in addition to the cold trap 39.

A discharge pipe 44 is connected to the outlet header 36 and extends upwardly to a height at least as great as the water level in the storage tank 40. The discharge pipe may discharge to the containment building, or to a vapor suppression heat sink (not shown) or to a catch tank or steam-separating device 51 FIG. 8. A pipe 52 connects the catch tank or steam-separating device 51 to the tank 40 to complete the flowpath from the outlet header 36 and the tube outlets to the inlet tubes and header 34. The steam condensed in the containment building or in a vapor suppression heat sink may be collected and returned to the storage tank 40 for recirculation.

In the structure shown in FIG. 3, sufficient surface area is provided in the basin so that the molten core will spread over the entire area and will form a thin layer. Over such an area and in such a limited thickness the molten core will solidify upon contact with the basin. The temperature of the steel in the basin will rise rapidly as heat is transferred from the molten core to the steel. A sufficient mass of steel or a second meltable material can be provided in the basin to form a heat sink that will rapidly cool and solidify the molten core without exceeding the melting point of the steel and without depending upon any heat transfer from the steel to the cooling water. If a second material of relatively low melting point 53, such as lead, is used in a layer above the water-filled tubes 32, this material in a molten state will also dilute the core material and improve the transfer of heat from the core material to the water-filled tubes 32. This could allow a larger amount of core material to be cooled by a given surface area of the basin.

Soon after the molten core material strikes the basin 28, heat will be transferred from the hot steel to the cooling water in the tubes 32. Cooling water will be converted to steam and flow out the outlet header. Flow would be out the outlet header and discharge pipe 44 because steam in endeavoring to go both ways would find less resistance in the discharge pipe 44 than in the inlet pipe 38. Also the large quantity of stored water in the tank 40 and would tend to condense any steam going back through the tank 40 and would thereby maintain a larger head in inlet pipe 38 than in the discharge pipe 44 because of the higher average density of the fluid in the inlet pipe 38. Furthermore the check valve 42 and/or a cold water trap 39 could be used to prevent upward flow of steam from the inlet header 34 through the inlet pipe 38. Because of the greater head provided by the stored water in tank 40 than is provided by the steam water mixture in discharge pipe 44, water will flow from the storage tank to the basin to replace the water converted to steam in the basin. Flow from the basin could be a two-phase mixture of steam and water. A catch tank or steam-separating device 51 FIG. 8 can be provided to collect the water. The water can be returned gravity flow to the storage tank at the basin inlet. A sufficient quantity of cooling water will be provided by the storage tank to remove heat from the core material and keep the core material in a solid state. The required external dimensions of the basin and waterwall can be substantially reduced by using extended surfaces such as pins 46 secured in heat-transmitting relation to the upper surface 28 of the waterwall forming the bottom of the basin. Such pins will increase the area of waterwall in contact with the molten or solidified core material and more rapidly conduct heat away from the core material. With such a construction a thicker layer of solidified core material may be cooled and maintained in the solid state.

Another method of increasing the radiating surface while decreasing the overall size of the basin is by means of a series of eggcrate-type partitions 48 (FIG. 5) secured in heat-transmitting relation with the upper surface 28 of the basin waterwall 26. Such a construction will divide the core material layer into a series of small pools and would be of particular advantage in the event that the basin upper surface was not quite level or warps.

It may be found advantageous to absorb some of the heat by radiation from the upper surface of the solidified core material. This can be done by elevating the headers 34 and 36 and extending the tubes 32 upwardly as at 50 (FIGS. 6 and 8) from the basin 26 and over the upper surface of the core material so that the water and steam passing through the tubes would be heated by radiation from the core material upper surface and thus carry away some more of the heat. By the proper choice of geometry, the heat transferred by radiation to the upturned portion of the basin formed by the tube ends connected to the outlet headers will improve natural circulation by heating directly a portion of the vertical outlet flowpath.

The safety system provided by this invention is completely passive. Actuation signals and sources of power are not required. The elevated storage tank will supply a sufficient quantity of water for several hours of decay heat removal. The molten core material will be rapidly solidified as soon as it contacts the comparatively cool massive basin. The core will be maintained as a solid so that the danger of molten core material flowing out of any cracks or holes that may develop in the waterwall or containment base slab have been eliminated. The uncertainties associated with maintaining molten core material have been eliminated by solidifying the core material. This invention does not require that the molten core material come in contact with water so that the uncertainties associated with maintaining molten core material has solidified, water may be added to the top of the slab of core material for additional heat removal if desired.

It will be understood that various changes in the details, materials and arrangements of parts which have been herein described and illustrated in order to explain the nature of the invention may be made by those skilled in the art within the principle and scope of the invention as expressed in the appended claims.

What is claimed is:

1. In a nuclear reactor system having a reactor vessel for enclosing a reactor core and a containment building surrounding said vessel, the combination comprising a basin located in said building and under said reactor vessel, tubes embedded in said basin, an elevated storage tank for cooling liquid, inlet means connecting said tank with said tubes and outlet means connected with said tubes.

2. A combination as claimed in claim 1 in which the outlet means is constructed and arranged so that gravity flow of unheated cooling water from said tubes is prevented by gravity and convection flow of heated cooling water from said tubes is automatically accommodated.

3. A combination as claimed in claim 1 in which said outlet means includes a stand pipe having an outlet at least as high as the liquid level in said tank.

4. A combination as claimed in claim 1 having a flowpath of cooling liquid from said outlet means to said inlet means, and means in said flowpath collecting water discharged from said tubes.

5. A combination as claimed in claim 4 in which said collecting means include a steam-separating device.

6. A combination as claimed in claim 1 in which said tubes are arranged in parallel relation in the bottom and sides of said basin.

7. A combination as claimed in claim 1 having heat-absorbing projections in heat-transferring connection with and extending upwardly from the surface of said basin.

8. A combination as claimed in claim 7 in which the projections comprise a plurality of studs.

9. A combination as claimed in claim 7 in which the projections include a plurality of partitions dividing the surface of said basin into separate receptacles.

10. A combination as claimed in claim 1 in which said basin incorporates a second heat-absorbing material, such as lead, to absorb heat and transfer said heat to said water-filled tubes.

11. A combination as claimed in claim 1 in which said tank, said inlet means and said outlet means are located in said building and said outlet means discharges into said building.

12. In combination with an airtight containment building housing a reactor vessel containing a nuclear reactor core, means for stopping the downward flow of molten core material which has melted through the bottom of said vessel, including in combination a metal container having a substantially level upper surface and raised sides located under said vessel and means for cooling said surface and solidifying said molten core material including a plurality of parallel tubes containing cooling liquid and arranged in heat-conducting relation to said surface, an elevated tank for storing cooling liquid and connected with said tubes for supplying said liquid to said tubes by gravity and means connected with said tubes for maintaining the liquid level in said tank until said surface and the liquid in said tubes are heated by said molten core material.

PO-1050
(5/69)

UNITED STATES PATENT OFFICE
CERTIFICATE OF CORRECTION

Patent No. 3,607,630           Dated September 21, 1971

Inventor(s) John M. West and William D. Fletcher, III

It is certified that error appears in the above-identified patent and that said Letters Patent are hereby corrected as shown below:

| | |
|---|---|
| Last Line of Abstract, | Change "convention" to --convection--. |
| Column 1, Line 22, | Change "an" to --and--. |
| Column 1, Line 56, | Before "temperature" change "at" second occurrence, to -- a --. |
| Column 4, Line 28, | After "in the tank 40" cancel "and". |
| Column 4, Line 42, | After "can be returned" insert --by--. |
| Column 5, Line 14, | After "maintaining molten core material" insert --in contact with water have been eliminated. After the core material--. |
| Column 5, Line 33, | Before "gravity" change "by" to --but--. |

Signed and sealed this 1st day of August 1972.

(SEAL)
Attest:

EDWARD M. FLETCHER, JR.        ROBERT GOTTSCHALK
Attesting Officer              Commissioner of Patents